US010823558B2

(12) United States Patent
Ohtomo et al.

(10) Patent No.: US 10,823,558 B2
(45) Date of Patent: Nov. 3, 2020

(54) SURVEYING INSTRUMENT

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

(*) Notice: Subject to any disclaimer, the term of this patent is extended or adjusted under 35 U.S.C. 154(b) by 531 days.

(21) Appl. No.: 15/345,714

(22) Filed: Nov. 8, 2016

(65) Prior Publication Data

US 2017/0138730 A1    May 18, 2017

(30) Foreign Application Priority Data

Nov. 18, 2015    (JP) .................. 2015-225251

(51) Int. Cl.
*G01C 15/00*    (2006.01)
*G01C 3/08*    (2006.01)
(Continued)

(52) U.S. Cl.
CPC .............. *G01C 3/08* (2013.01); *G01C 1/02* (2013.01); *G01C 9/02* (2013.01); *G01C 15/002* (2013.01);
(Continued)

(58) Field of Classification Search
None
See application file for complete search history.

(56) References Cited

U.S. PATENT DOCUMENTS 5,983,510 A * 11/1999 Wu .................. G01C 15/004
33/227
6,411,372 B1 * 6/2002 Donath .................. G01C 1/02
356/4.08
(Continued)

FOREIGN PATENT DOCUMENTS

EP    2998701 A1    3/2016
EP    3056856 A1    8/2016
(Continued)

OTHER PUBLICATIONS

European communication dated Apr. 7, 2017 in corresponding European patent application No. 16199244.1.

*Primary Examiner* — Hovhannes Baghdasaryan
(74) *Attorney, Agent, or Firm* — Nields, Lemack & Frame, LLC

(57) ABSTRACT

The invention provides a surveying instrument, which comprises a protractor table installed via an installation base and capable of detecting a lateral rotation angle and a surveying instrument main unit mounted on the protractor table via supporting mechanisms capable of rotating longitudinally, wherein the supporting mechanisms enables the surveying instrument main unit to set in a predetermined angle condition with respect to the protractor table, wherein the surveying instrument main unit comprises a distance measuring unit which has a light emitting element for emitting a distance measuring light, a distance measuring light projecting unit for projecting the distance measuring light, a light receiving unit for receiving a reflected distance measuring light and a photodetector for receiving the reflected distance measuring light and for producing a light receiving signal, and the distance measuring unit performs a distance measurement of an object to be measured based on the light receiving signal from the photodetector, a control unit for controlling a distance measuring operation, an optical axis deflecting unit, which is provided on an optical axis of the distance measuring light projecting unit and on an optical axis of the light receiving unit, for controlling a deflection of the both optical axes and an attitude detecting unit which has a tilt detecting unit for detecting a horizontal and mechanisms for tilting the tilt detecting unit so that the tilt detecting unit is maintained horizontally, and is configured to detect a tilting amount of the surveying instrument main unit.

16 Claims, 13 Drawing Sheets

(51) Int. Cl.
  *G01C 9/02* (2006.01)
  *G01S 7/497* (2006.01)
  *G01C 1/02* (2006.01)
  *G01S 7/481* (2006.01)
  *G01S 17/42* (2006.01)

(52) U.S. Cl.
  CPC .......... *G01C 15/006* (2013.01); *G01S 7/4813* (2013.01); *G01S 7/4972* (2013.01); *G01S 17/42* (2013.01)

(56) References Cited

U.S. PATENT DOCUMENTS

| | | | |
|---|---|---|---|
| 6,427,347 B1* | 8/2002 | Butler, Sr. | G01C 15/002 33/286 |
| 9,273,959 B2* | 3/2016 | Kumagai | G01C 15/002 |
| 9,945,938 B2* | 4/2018 | Markendorf | G01S 17/023 |
| 2003/0229996 A1 | 12/2003 | Tamamura | |
| 2009/0024342 A1* | 1/2009 | Hertzman | G01C 15/00 702/94 |
| 2012/0216413 A1 | 8/2012 | Adegawa | |
| 2014/0202012 A1 | 7/2014 | Vogel et al. | |

FOREIGN PATENT DOCUMENTS

| | | |
|---|---|---|
| EP | 3056857 A1 | 8/2016 |
| WO | 2004/099849 A1 | 11/2004 |

\* cited by examiner $Y = \sin\theta$, $X = \cos\theta \cos\phi$ $\theta' = \tan^{-1}(Y/X) = \tan^{-1}\{\sin\theta / (\cos\theta \cos\phi)\}$

THE SAME DEFLECTION ANGLE

A AND A', B AND B' ARE ROTATED IN SYNCHRONIZATION

SURVEYING INSTRUMENT

BACKGROUND OF THE INVENTION

The present invention relates to a surveying instrument, in particular, a surveying instrument, by which it is possible to omit a leveling operation and further to easily measure an installation reference position.

In general, a surveying expresses a plurality of measuring points, which are objects on a ground surface, in relation to a horizontal distance and a height. As a surveying instrument to be used for the surveying, a total station is known, for instance.

On a plurality of the measuring points, a distance (a slope distance), a vertical angle, and a horizontal angle are measured by the total station respectively, and the relations between the measuring points are obtained respectively.

The total station must be installed via a tripod at an installation point (a reference point), and further must be installed horizontally with high accuracy.

Although the total station has a function to detect a tilt angle of a surveying system main unit with respect to the vertical with high accuracy, a detection range is narrow and about 6 arc minutes. For this reason, when the total station is installed, an installation condition of the total station must be adjusted by such a manner that an adjustment of the tripod or a leveling by hand, or the like so that the total station is within the detection range and becomes approximately horizontally.

Further, a position of the total station has been adjusted and further, a relation between the installation point and the total station has been measured so that the total station was set just above the installation point.

Therefore, for an installation of the total station, much time has been required, and further, high skill has been required.

SUMMARY OF THE INVENTION

It is an object of the present invention to provide a surveying instrument which can perform a surveying without requiring a leveling operation.

To attain the object of the invention as described above, a surveying instrument according to the present invention comprises a protractor table installed via an installation base and capable of detecting a lateral rotation angle and a surveying instrument main unit mounted on the protractor table via supporting mechanisms capable of rotating longitudinally, wherein the supporting mechanisms enables the surveying instrument main unit to set in a predetermined angle condition with respect to the protractor table, wherein the surveying instrument main unit comprises a distance measuring unit which has a light emitting element for emitting a distance measuring light, a distance measuring light projecting unit for projecting the distance measuring light, a light receiving unit for receiving a reflected distance measuring light and a photodetector for receiving the reflected distance measuring light and for producing a light receiving signal, and the distance measuring unit performs a distance measurement of an object to be measured based on the light receiving signal from the photodetector, a control unit for controlling a distance measuring operation, an optical axis deflecting unit, which is provided on an optical axis of the distance measuring light projecting unit and on an optical axis of the light receiving unit, for controlling a deflection of the both optical axes and an attitude detecting unit which has a tilt detecting unit for detecting a horizontal and mechanisms for tilting the tilt detecting unit so that the tilt detecting unit is maintained horizontally, and is configured to detect a tilting amount of the surveying instrument main unit.

Further, in the surveying instrument according to the present invention, the control unit is configured to calculate the tilting amount of the surveying instrument main unit with respect to a vertical based on the tilting amount detected by the attitude detecting unit in a condition where the surveying instrument main unit is in the predetermined angle condition with respect to the protractor table, to calculate a tilting amount of the protractor table with respect to the horizontal, and to correct a measurement result of the object to be measured based on a calculation result.

Further, in the surveying instrument according to the present invention, the control unit is configured to calculate the tilting amount of the surveying instrument main unit with respect to the vertical based on the tilting amount detected by the attitude detecting unit in a condition where the surveying instrument main unit is in the predetermined angle condition with respect to the protractor table, and to deflect the optical axis of the distance measuring light projecting unit so that the distance measuring light is projected vertically by the optical axis deflecting unit.

Further, in the surveying instrument according to the present invention, the installation base is installed near a reference point, and the control unit is configured to calculate the tilting amount of the surveying instrument main unit with respect to the vertical based on the tilting amount detected by the attitude detecting unit in a condition where the surveying instrument main unit is in the predetermined angle condition with respect to the protractor table, to project the distance measuring light to the reference point by controlling the optical axis deflecting unit, and to measure a position of the reference point based on the tilting amount, on a deflection amount of the distance measuring light by the optical axis deflecting unit and on a result of the distance measurement to the reference point.

Furthermore, in the surveying instrument according to the present invention, the control unit is configured to change an irradiating direction of the distance measuring light by the optical axis deflecting unit, to project the distance measuring light to a measuring point, and to perform a measurement of the measuring point.

According to the present invention, the surveying instrument comprises a protractor table installed via an installation base and capable of detecting a lateral rotation angle and a surveying instrument main unit mounted on the protractor table via supporting mechanisms capable of rotating longitudinally, wherein the supporting mechanisms enables the surveying instrument main unit to set in a predetermined angle condition with respect to the protractor table, wherein the surveying instrument main unit comprises a distance measuring unit which has a light emitting element for emitting a distance measuring light, a distance measuring light projecting unit for projecting the distance measuring light, a light receiving unit for receiving a reflected distance measuring light and a photodetector for receiving the reflected distance measuring light and for producing a light receiving signal, and the distance measuring unit performs a distance measurement of an object to be measured based on the light receiving signal from the photodetector, a control unit for controlling a distance measuring operation, an optical axis deflecting unit, which is provided on an optical axis of the distance measuring light projecting unit and on an optical axis of the light receiving unit, for controlling a deflection of the both optical axes and an attitude detecting unit which has a tilt detecting unit for detecting a horizontal and mechanisms for tilting the tilt detecting unit so that the tilt detecting unit is maintained horizontally, and is configured to detect a tilting amount of the surveying instrument main unit. As a result, it is possible to detect the tilting amount of the surveying instrument main unit with respect to the horizontal or the vertical, the measurement results can be corrected based on the tilting amount, and the measurement can be performed without leveling the surveying instrument main unit horizontally.

BRIEF DESCRIPTION OF THE DRAWINGS

FIG. 2A is an explanatory drawing where a surveying instrument main unit is supported in an approximate horizontal condition, and FIG. 2B is an explanatory drawing to show a condition where the surveying instrument main unit is rotated by an angle of 90° from a condition as shown in FIG. 2A.

DETAILED DESCRIPTION OF THE PREFERRED EMBODIMENT

A description will be given below on an embodiment of the present invention by referring to the attached drawings.

First, referring to FIG. 1, a description will be given on an outline of a surveying instrument according to the present embodiment.

Figure 1:
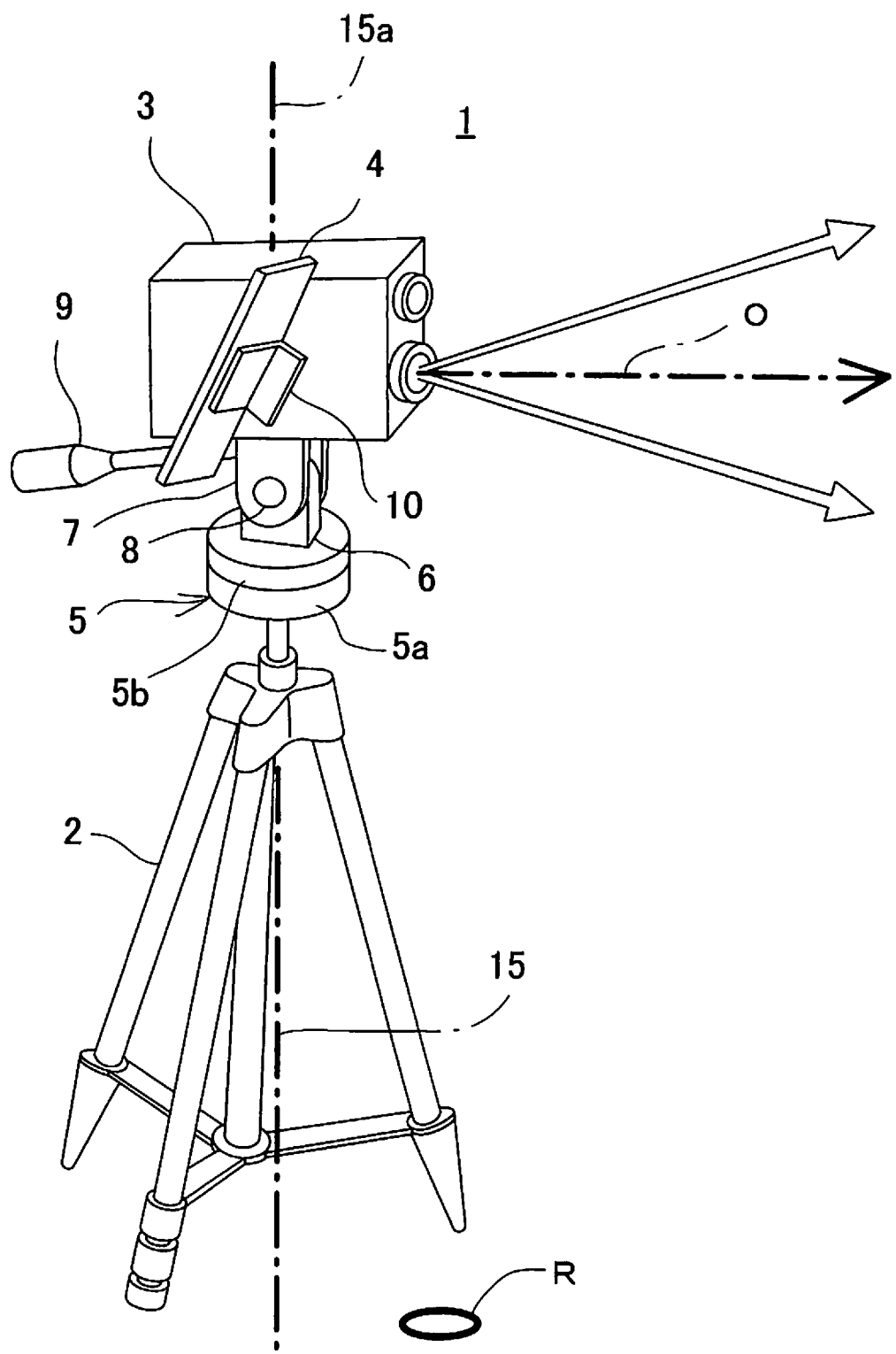
FIG. 1 is a schematical perspective view of an embodiment of the present invention.

In FIG. 1, reference numeral 1 denotes a surveying instrument, and reference letter O denotes a distance measuring optical axis when the optical axis is not deflected. The surveying instrument 1 is installed near an installation point (a reference point) via an installation base. In the figure, a tripod 2 is shown as the installation base. By the surveying instrument 1, a measurement can be performed according to a prism measurement mode in which an object to be measured is a prism, and in a case where the object to be measured is a structure, or the like, the measurement can be performed according to a non-prism measurement mode without using the prism.

The surveying instrument 1 primarily comprises a surveying instrument main unit 3, an operation device 4, and a protractor table 5. The protractor table 5 is mounted on an upper end of the tripod 2, is an angle detector for detecting a lateral rotation angle of the surveying instrument 1, and also functions as a mount base where the surveying instrument main unit 3 is mounted. The surveying instrument main unit 3 is mounted on the protractor table 5 via a supporting mechanism, which can be rotated longitudinally with respect to the protractor table 5.

A description will be given on one example of the supporting mechanism.

On an upper surface of the protractor table 5, a lower supporting piece 6 is provided to protrude upward. On a lower surface of the surveying instrument main unit 3, an upper supporting piece 7 in a bifurcated shape is provided to protrude downward. The upper supporting piece 7 is fitted in the lower supporting piece 6, and a longitudinal rotation shaft 8 penetrates the lower supporting piece 6 and the upper supporting piece 7 as fitted each other in a lateral direction. The lower supporting piece 6 and the upper supporting piece 7 are freely rotatably connected via the longitudinal rotation shaft 8.

Therefore, the surveying instrument main unit 3 and the protractor table 5 are connected via the lower supporting piece 6, the upper supporting piece 7, and the longitudinal rotation shaft 8 and is so arranged as to be rotatable in a longitudinal direction around the longitudinal rotation shaft 8 as the center.

A lever 9 extending in the lateral direction is provided on the upper supporting piece 7. By moving the lever 9 up and down, the surveying instrument main unit 3 is so arranged as to rotate in the longitudinal direction around the longitudinal rotation shaft 8 as the center.

Further, the lever 9 is screwed into the upper supporting piece 7. By rotating the lever 9 around an axis of the lever 9 as the center and tightening, a rotation between the lower supporting piece 6 and the upper supporting piece 7 is restricted, and by loosening the lever 9, the upper supporting piece 7 can freely rotate.

It is to be noted that as for restricting the rotation between the lower supporting piece 6 and the upper supporting piece 7 by an operation of the lever 9, various methods can be adopted. For instance, it may be arranged in such a manner that a tip of the lever 9 is pressed on the longitudinal rotation shaft 8 by screwing the lever 9.

The surveying instrument main unit 3 has a built-in distance measuring unit (to be described later) and a built-in attitude detecting unit (to be described later), and the distance measuring unit projects a distance measuring light toward an object to be measured or to a measurement area, receives a reflected distance measuring light and performs a distance measurement. Further, the attitude detecting unit can detect an attitude of the surveying instrument main unit 3 with respect to the vertical (or the horizontal) with high accuracy.

The operation device 4 has a communication function to perform a communication to and from the surveying instrument main unit 3 via a manner as required such as a wired manner or non-wired manner, or the like. Further, the operation device 4 has a display unit 4a and an operation unit 4b (see FIG. 6) and can operate the surveying instrument 1 by an operation from the operation unit 4b. Further, images, measuring conditions, measurement results, or the like are transmitted to the operation device 4 from the surveying instrument main unit 3, and the images, the measuring conditions, the measurement results, or the like are stored in the operation device 4 or are displayed on the display unit 4a.

It is to be noted that the display unit 4a may be designed as a touch panel, and the display unit 4a may be commonly used as the operation unit 4b.

The operation device 4 is designed as a smart phone, for instance and may be attachable to or detachable from the surveying instrument main unit 3 by an attachment 10.

The protractor table 5 has a fixed disk 5a and a rotary table 5b which can rotate laterally with respect to the fixed disk 5a and has a structure that a lateral rotation angle between the fixed disk 5a and the rotary table 5b can be detected.

Figure 2A:
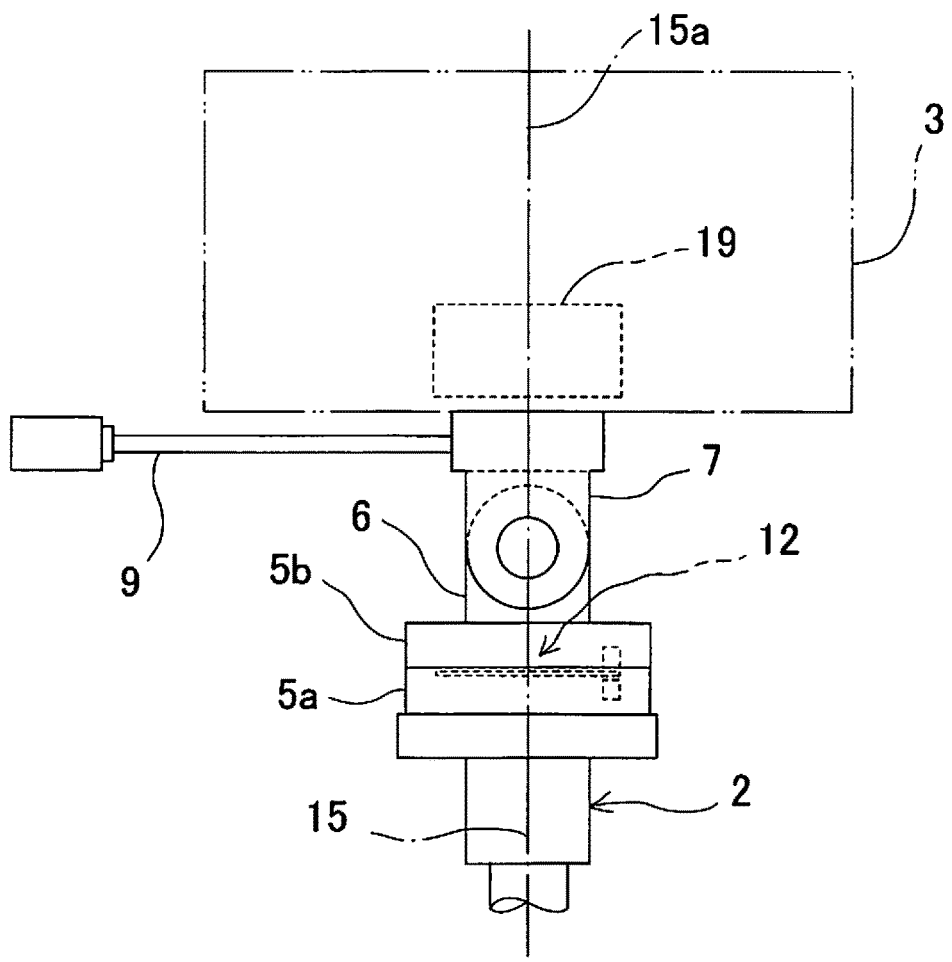
FIG. 2A and FIG. 2B show one example of a surveying instrument main unit supporting mechanism.
Figure 2B:
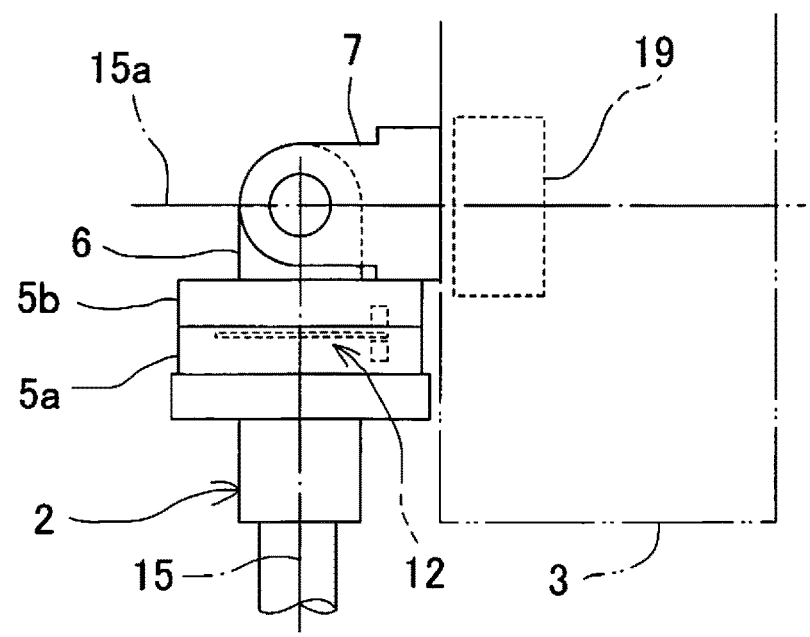

As the structure capable of detecting the lateral rotation angle, it can be consider that as shown in FIG. 2A and FIG. 2B, for instance, an encoder 12 may be provided between the fixed disk 5a and the rotary table 5b, or the like.

The protractor table 5 is set perpendicularly to a mechanical reference line 15 as set for the surveying instrument 1. Therefore, when the protractor table 5 is in a horizontal condition and the surveying instrument main unit 3 is in the horizontal condition, the surveying instrument 1 is in a reference attitude, and an auxiliary mechanical reference line 15a which the surveying instrument main unit 3 itself has is vertical and coincides with the mechanical reference line 15.

As a method for detecting or setting the perpendicularity with respect to the protractor table 5 of the surveying instrument main unit 3, it may be so arranged that a reference position detecting sensor (not shown) is provided between the surveying instrument main unit 3 and the protractor table 5, and the perpendicularity of the two is set based on a signal from the reference position detecting sensor. Alternatively, it may be so arranged that an encoder (not shown) is provided on the longitudinal rotation shaft 8, an angle between the lower supporting piece 6 (the protractor table 5) and the upper supporting piece 7 (the surveying instrument main unit 3) is detected, and the perpendicularity of the surveying instrument main unit 3 is detected or set with respect to the protractor table 5 based on a detection result. Alternatively, the perpendicularity between the two may be set mechanically.

FIG. 2A and FIG. 2B show a case where it is configured so as to mechanically realize a vertical attitude between the protractor table 5 and the surveying instrument main unit 3.

In a case where the upper supporting piece 7 rotates at an angle of 90° with respect to the mechanical reference line 15 (see FIG. 2B), the upper supporting piece 7 is arranged so as to come into contact with a part as required (an upper surface in the figure) of the rotary table 5b. In this condition, the auxiliary mechanical reference line 15a perpendicularly crosses the mechanical reference line 15. That is, when the surveying instrument main unit 3 is rotated until the upper supporting piece 7 comes into contact with the rotary table 5b, the attitude of the surveying instrument main unit 3 with respect to the mechanical reference line 15 is determined.

Therefore, if the protractor table 5 is set in a horizontal position, the auxiliary mechanical reference line 15a is horizontal. Further, if the protractor table 5 tilts with respect to the horizontal, the auxiliary mechanical reference line 15a tilts with respect to the horizontal by a tilting of the protractor table 5. That is, the tilting of the protractor table 5 is accurately reflected as the tilting of the auxiliary mechanical reference line 15a with respect to the horizontal.

The surveying instrument main unit 3 is provided with an attitude detecting unit 19 for detecting the attitude of the surveying instrument main unit 3 with respect to the vertical (or the horizontal) with high accuracy.

The attitude detecting unit 19 detects the vertical (or the horizontal) even when the surveying instrument main unit 3 is in such a vertical attitude as shown in FIG. 2B. Therefore, if the surveying instrument main unit 3 does not tilt with respect to the detection result of the attitude detecting unit 19, the surveying instrument main unit 3 is in the attitude as accurately rotated by an angle of 90°. In this case, the auxiliary mechanical reference line 15a of the surveying instrument main unit 3 is horizontal and the protractor table 5 is in the horizontal position.

Therefore, the lateral rotation angle of the protractor table 5 as obtained at the time of a measurement can be used as a measurement value without correcting.

Next, in a condition as shown in FIG. 2B, that is, in a condition where the surveying instrument main unit 3 is perpendicular with respect to the protractor table 5, when the surveying instrument main unit 3 tilts with respect to the detection result (the horizontal) of the attitude detecting unit 19, it means that the auxiliary mechanical reference line 15a tilts with respect to the horizontal. Further, it means that the protractor table 5 tilts with respect to the horizontal by this tilting.

In this case, the lateral rotation angle of the protractor table 5 as obtained at the time of the measurement includes an error. However, if the lateral rotation angle of the protractor table 5 is corrected based on the tilting, an accurate lateral rotation angle can be obtained.

Figure 3:
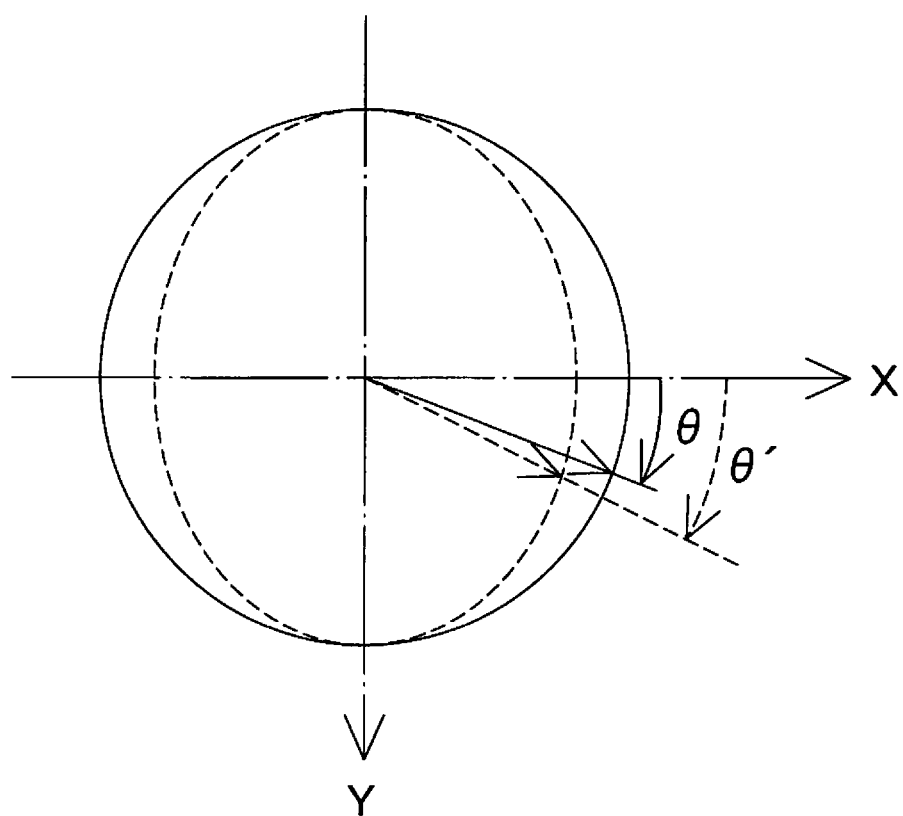
FIG. 3 is a drawing to explain a correction of a lateral rotation angle in a case where a protractor table is tilted with respect to the horizontal plane.

Referring to FIG. 3, a description will be given briefly on a correction of the lateral rotation angle in a case where the protractor table 5 is tilted.

In FIG. 3, an X-axis and a Y-axis show arbitrary reference directions (e.g. a reference direction at the time of an initial setting). For instance, when the protractor table 5 is tilted at an angle of φ, i.e. when the protractor table 5 is tilted at an angle of φ around the Y-axis as the center, a Y-component is not changed, and an X-component becomes X cos φ. That is, when a direction of the surveying instrument main unit 3 is rotated by an angle of θ with respect to the X-axis, Y=sin θ, X=cos θ cos φ

Therefore, a correction can be performed as follows:

$$\theta' = \tan^{-1}(Y/X)$$
$$= \tan^{-1}\{\sin\theta/(\cos\theta\cos\varphi)\}$$

Therefore, in a case where the surveying instrument 1 is installed, an accurate measurement can be carried out by simply installing without leveling.

A description will be given on the attitude detecting unit 19 by referring to FIG. 4 and FIG. 5. It is to be noted that in the description as given below, the top and bottom corresponds to the top and bottom in the figure, and the left and right corresponds to the left and right in the figure.

Inside an outer frame 51 with a rectangular frame shape, an inner frame 53 with a rectangular frame shape is provided, and inside the inner frame 53, a tilt detecting unit 56 is provided.

From an upper surface and a lower surface of the inner frame 53, longitudinal shafts 54 and 54 are protruded. The longitudinal shafts 54 and 54 are rotatably fitted with bearings 52 and 52 as provided on the outer frame 51. The longitudinal shafts 54 and 54 have a longitudinal axis, and the inner frame 53 is capable of rotating freely by 360° in a left-to-right direction around the longitudinal shafts 54 and 54 as the center.

The tilt detecting unit 56 is supported by a lateral shaft 55, and both end portions of the lateral shaft 55 are rotatably fitted with bearings 57 and 57 provided on the inner frame 53. The lateral shaft 55 has a lateral axis perpendicular to the longitudinal axis, and the tilt detecting unit 56 is capable of rotating freely by 360° in an up-to-bottom direction around the lateral shaft 55 as the center.

That is, the tilt detecting unit 56 is configured so as to be supported via a zimbal mechanism, which is capable of rotating freely by 360° in two axial directions with respect to the outer frame 51.

On one of the longitudinal shafts 54 and 54, for instance, a first gear 58 is attached to the lower longitudinal shaft 54, and a first driving gear 59 meshes with the first gear 58. Further, a first motor 61 is provided on a lower surface of the outer frame 51, and the first driving gear 59 is attached to an output shaft of the first motor 61.

On the other of the longitudinal shafts 54 and 54, a first encoder 62 is attached. The first encoder 62 is configured so as to detect a rotation angle in the left-to-right direction of the inner frame 53 with respect to the outer frame 51.

On one end of the lateral shaft 55, a second gear 63 is attached, and a second driving gear 64 meshes with the second gear 63. Further, on a side surface (left side surface in the figure) of the inner frame 53, a second motor 65 is attached, and the second driving gear 64 is attached to an output shaft of the second motor 65.

On the other end of the lateral shaft 55, a second encoder 66 is attached. The second encoder 66 is configured so as to detect a rotation angle in the up-to-bottom direction of the tilt detecting unit 56 with respect to the inner frame 53.

The first encoder 62 and the second encoder 66 are electrically connected to a first arithmetic processing unit 68.

The tilt detecting unit 56 has a first tilt sensor 71 and a second tilt sensor 72, and the first tilt sensor 71 and the second tilt sensor 72 are electrically connected to the first arithmetic processing unit 68.

Further description will be given on the attitude detecting unit 19 by referring to FIG. 5.

The attitude detecting unit 19 comprises the first encoder 62, the second encoder 66, the first tilt sensor 71, the second tilt sensor 72, the first arithmetic processing unit 68, the first motor 61, and the second motor 65. Further, the attitude detecting unit 19 comprises a storage unit 73 and an input/output control unit 74.

In the storage unit 73, programs such as a calculation program for an attitude detection and the like, and data such as calculation data and the like are stored.

The input/output control unit 74 drives the first motor 61 and the second motor 65 based on a control instruction output from the first arithmetic processing unit 68 and outputs a result of a tilt detection calculated by the first arithmetic processing unit 68 as a detection signal.

The first tilt sensor 71 is for detecting the horizontal with high accuracy, for instance, a tilt detector in which a detection light incidents to a horizontal liquid surface and the horizontal is detected according to a change of a reflection angle of a reflected light, or a bubble tube which detects a tilting according to a positional change of an air bubble sealed in a tube. Further, the second tilt sensor 72 is for detecting a tilt change with high responsiveness, for instance, an acceleration sensor.

It is to be noted that both the first tilt sensor 71 and the second tilt sensor 72 can individually detect tiltings in the two axial directions, which are a rotating direction (a tilting direction) detected by the first encoder 62 and a rotating direction (a tilting direction) detected by the second encoder 66.

The first arithmetic processing unit 68 calculates a tilt angle and a tilting direction based on detection results from the first tilt sensor 71 and the second tilt sensor 72. Further, the first arithmetic processing unit 68 calculates a tilt angle of the surveying instrument main unit 3 with respect to a verticality based on a rotation angle of the first encoder 62 and on a rotation angle of the second encoder 66, which correspond to the tilt angle and the tilting direction.

It is to be noted that in a case where the outer frame 51 is installed horizontally, the attitude detecting unit 19 is set such that the first tilt sensor 71 detects the horizontal, and further, is set such that an output of the first encoder 62 and an output of the second encoder 66 both indicate a reference position (rotation angle at 0°).

A description will be given on an operation of the attitude detecting unit 19.

First, a description will be given on a case where a tilting is detected with high accuracy.

As the case where the tilting is detected with high accuracy, there is a case where the attitude detecting unit 19 is provided on an installation-type surveying instrument as shown in FIG. 1, for instance.

When the attitude detecting unit 19 is tilted, the first tilt sensor 71 outputs a signal corresponding to a tilting.

The first arithmetic processing unit 68 calculates a tilt angle and a tilting direction based on the signal from the first tilt sensor 71 and further calculates rotation amounts of the first motor 61 and the second motor 65 in order to make the tilt angle and the tilting direction 0 based on a calculation result. The first arithmetic processing unit 68 outputs a driving command for driving the first motor 61 and the second motor 65 by the rotation amounts via the input/output control unit 74.

According to the driving command from the first arithmetic processing unit 68, the first motor 61 and the second motor 65 are driven so as to be tilted oppositely to the calculated tilt angle and the tilting direction. Rotation amounts (the rotation angles) of the motors are detected by the first encoder 62 and the second encoder 66 respectively, and when the rotation angles reach the calculation results, the drivings of the first motor 61 and the second motor 65 are stopped.

In this state, under the condition where the outer frame 51 is tilted, the tilt detecting unit 56 is controlled to the horizontal.

Therefore, in order to make the tilt detecting unit 56 horizontal, the tilt angles and the tilting directions where the inner frame 53 and the tilt detecting unit 56 are tilted by the first motor 61 and the second motor 65, are acquired based on the rotation angles as detected by the first encoder 62 and the second encoder 66.

The first arithmetic processing unit 68 calculates the tilt angle and the tilting direction of the attitude detecting unit 19 based on the detection results of the first encoder 62 and the second encoder 66 when the first tilt sensor 71 detects the horizontal. The calculation result indicates the attitude of the attitude detecting unit 19 after the attitude detecting unit 19 is tilted.

The first arithmetic processing unit 68 outputs the calculated tilt angle and the tilting direction to an outside via the input/output control unit 74 as a detection signal of the attitude detecting unit 19.

Figure 4:
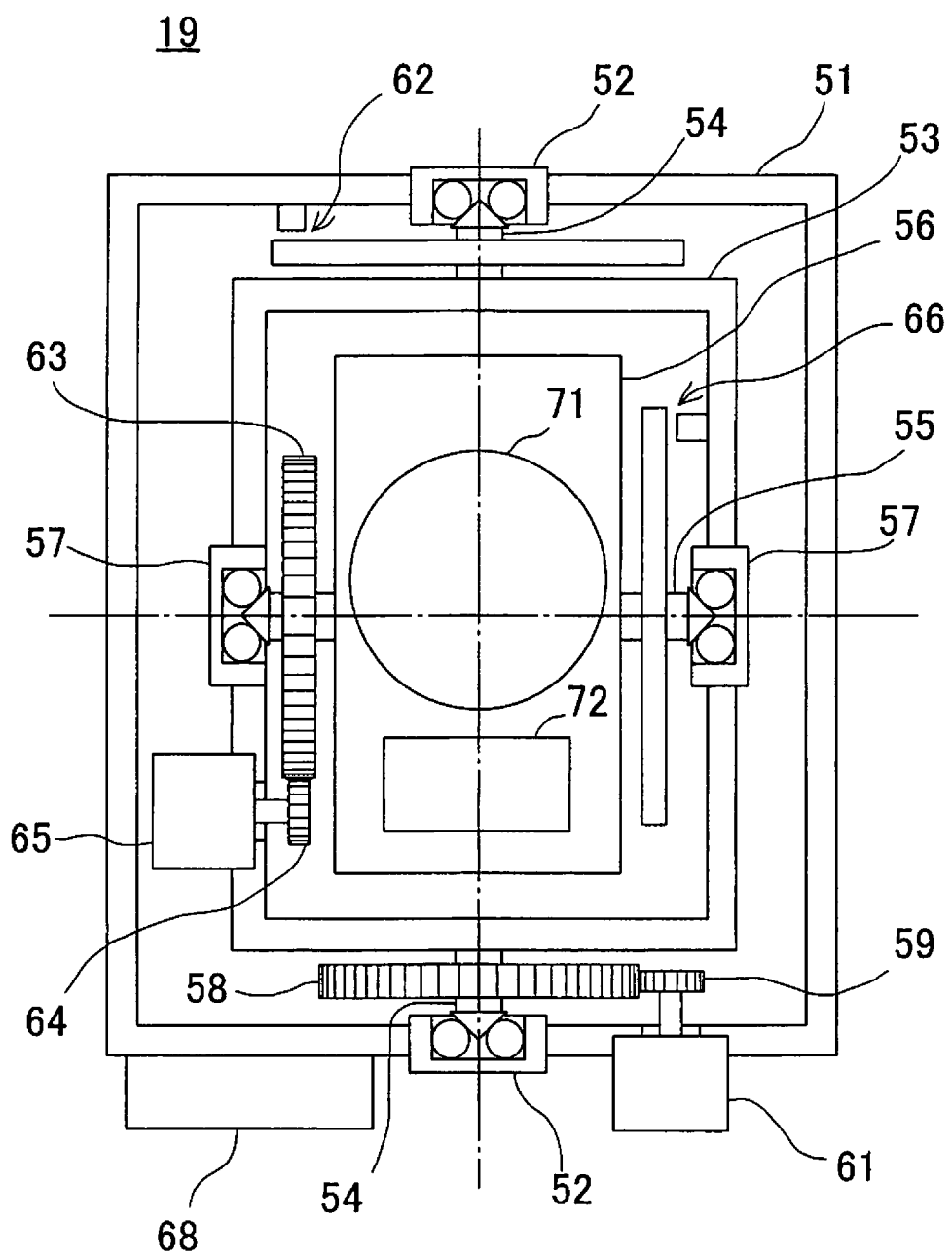
FIG. 4 is a schematical drawing of an attitude detecting unit to be used in the present embodiment.
Figure 5:
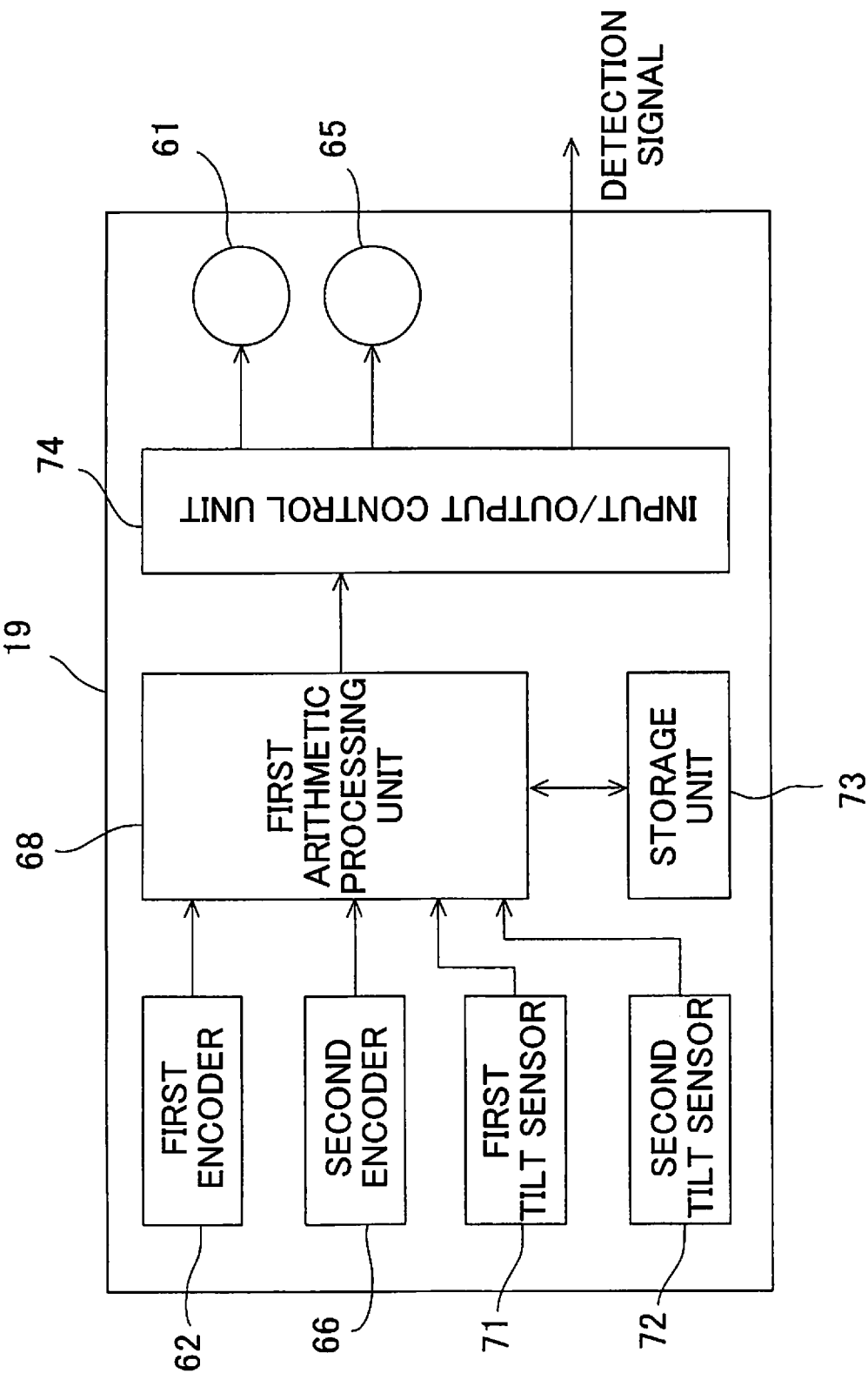
FIG. 5 is a schematical block diagram of the attitude detecting unit.

In the attitude detecting unit 19, as a structure shown in FIG. 4, there is nothing which restricts rotations of the tilt detecting unit 56 and the inner frame 53. Therefore, the tilt detecting unit 56 and the inner frame 53 can both rotate by 360° or more. That is, no matter what attitude the attitude detecting unit 19 takes (even in a case where the attitude detecting unit 19 is upside down, for instance), the attitude detection in all directions can be performed.

As shown in FIG. 2B, in a case where the surveying instrument main unit 3 is rotated at an angle of 90°, although the attitude detecting unit 19 as accommodated inside is also rotated at an angle of 90°, the first motor 61 and the second motor 65 are driven so that the tilt detecting unit 56 maintains the horizontal.

Therefore, in a condition as shown in FIG. 2B, the tilt detecting unit 56 detects the horizontal and the second encoder 66 detects 90°.

In a case where high responsiveness is required, although the attitude detection and an attitude control are performed based on the detection result of the second tilt sensor 72, the second tilt sensor 72 has poorer detection accuracy than the first tilt sensor 71 in general.

In the present embodiment, by comprising the first tilt sensor 71 with high accuracy and the second tilt sensor 72 with high responsiveness, the attitude control is performed based on the detection results of the second tilt sensor 72, and the attitude detection with high accuracy can be performed by the first tilt sensor 71.

That is, based on the tilt angle as detected by the second tilt sensor 72, the first motor 61 and the second motor 65 are driven so that the tilt angle becomes 0°. Further, by continuing the driving of the first motor 61 and the second motor 65 until the first tilt sensor 71 detects the horizontal, the attitude can be detected with high accuracy. If a deviation occurs between values of the first encoder 62 and the second encoder 66 when the first tilt sensor 71 detects the horizontal (that is, an actual tilt angle) and the tilt angle as detected by the second tilt sensor 72, the tilt angle of the second tilt sensor 72 can be calibrated based on the deviation.

Therefore, by obtaining a relation between the detected tilt angle of the second tilt sensor 72 and the tilt angle which is obtained based on the horizontal detection by the first tilt sensor 71 and the detection result of the first encoder 62 and the second encoder 66 in advance, the tilt angle detected by the second tilt sensor 72 can be calibrated. Thereby, accuracy of the attitude detection with high responsiveness by the second tilt sensor 72 can be improved.

The attitude detecting unit 19 can be applied to various devices. Particularly, the horizontal can be detected with high responsiveness and with high accuracy if the attitude detecting unit 19 is applied to a portable type device of which the attitude is not stable.

Figure 6:
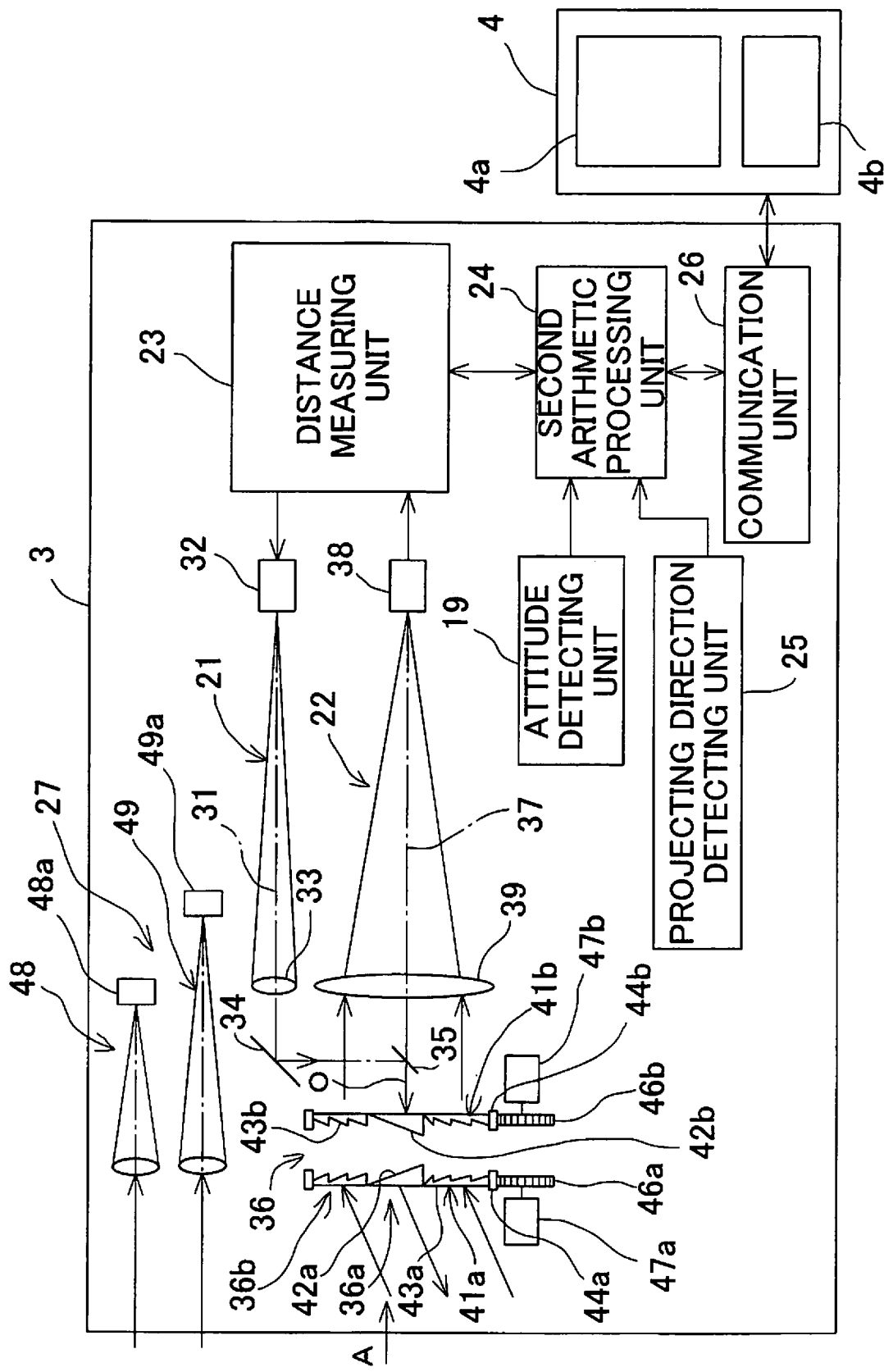
FIG. 6 is a schematical block diagram of the surveying instrument main unit according to the present embodiment.
Figure 7:
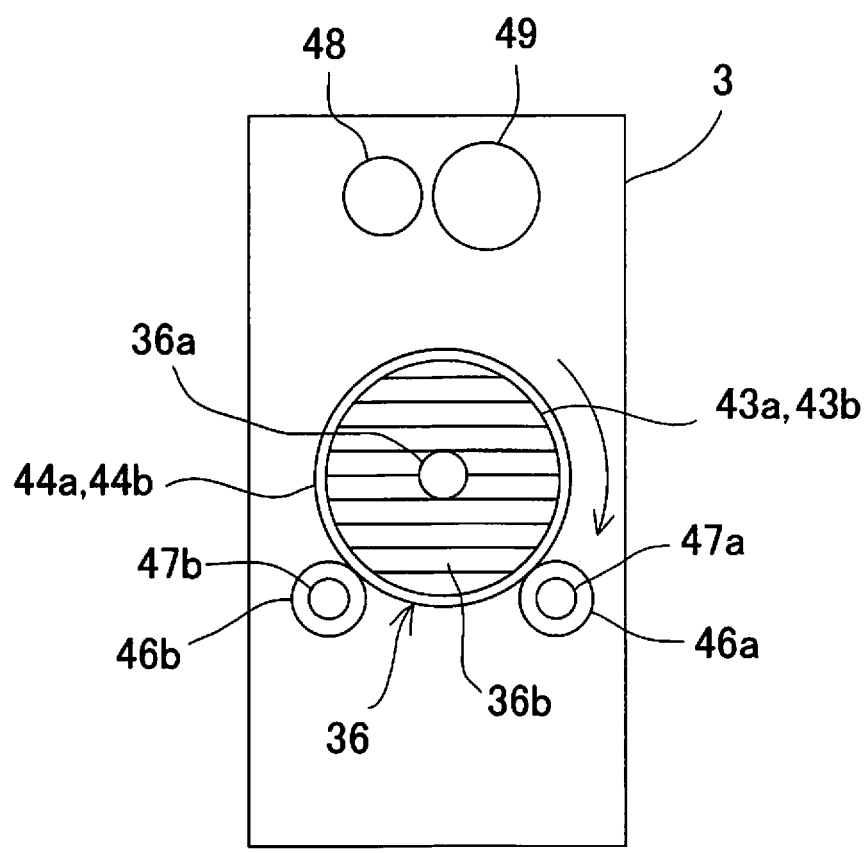
FIG. 7 is an arrow view along line A in FIG. 6.

Next, a description will be given on the surveying instrument main unit 3 by referring to FIG. 6 and FIG. 7.

The surveying instrument main unit 3 has a distance measuring light projecting unit 21, a light receiving unit 22, a distance measuring unit 23, a second arithmetic processing unit 24, a projecting direction detecting unit 25, a communication unit 26, an image pickup unit 27, and the attitude detecting unit 19.

The distance measuring light projecting unit 21 projects the distance measuring light. The distance measuring light projecting unit 21 has a projection optical axis 31, a light emitting element 32, for instance, a laser diode (LD) is provided on the projection optical axis 31. Further, a projecting lens 33 is provided on the projection optical axis 31.

Further, a first reflection mirror 34 as a deflecting optical component is provided on the projection optical axis 31. Further, a second reflection mirror 35 as the deflecting optical component is faced with the first reflection mirror 34 and disposed on a light receiving optical axis 37 (to be described later).

By the first reflection mirror 34 and the second reflection mirror 35, the projection optical axis 31 is coincided with the distance measuring optical axis O. An optical axis deflecting unit 36 is disposed on the distance measuring optical axis O.

The light receiving unit 22 receives a reflected distance measuring light from the object to be measured. The light receiving unit 22 has the light receiving optical axis 37 running in parallel to the projection optical axis 31, and the light receiving optical axis 37 is commonly used as the distance measuring optical axis O.

A photodetector 38, for instance, a photo diode (PD), is provided on the light receiving optical axis 37. Further, an image forming lens 39 is disposed on the light receiving optical axis 37. The image forming lens 39 forms an image of the reflected distance measuring light on the photodetector 38. The photodetector 38 receives the reflected distance measuring light and produces a light receiving signal. The light receiving signal is inputted to the distance measuring unit 23.

Further, on the light receiving optical axis 37, the optical axis deflecting unit 36 is arranged on an objective side of the image forming lens 39.

A description will be given on the optical axis deflecting unit 36.

In the optical axis deflecting unit 36, a pair of optical prisms 41a and 41b is provided. Each of the optical prisms 41a and 41b is designed in disk-like shape, disposed perpendicularly crossing the light receiving optical axis 37, overlapped on each other, and arranged in parallel to each other. As for the optical prisms 41a and 41b, a Fresnel prism is preferably used respectively in order to reduce a size of an instrument.

A central part of the optical axis deflecting unit 36 is designed as a distance measuring light deflecting unit 36a where the distance measuring light passes, and a part except the central part is designed as a reflected distance measuring light deflecting unit 36b.

The Fresnel prism used as the optical prisms 41a and 41b is composed of prism elements 42a and 42b and a large number of prism elements 43a and 43b arranged in parallel to each other respectively and has a plate shape. The prism element 42a and the prism element 42b as well as the prism element 43a and the prism element 43b have the same optical characteristics respectively.

The prism elements 42a and 42b make up the distance measuring light deflecting unit 36a, and the prism elements 43a and 43b make up the reflected distance measuring light deflecting unit 36b.

The Fresnel prism may be manufactured by an optical glass but may be molded by an optical plastic material. By molding the Fresnel prism by the optical plastic material, a low cost Fresnel prism can be manufactured.

Each of the optical prisms 41a and 41b is arranged in such a manner that each of the optical prisms 41a and 41b rotates with the light receiving optical axis 37 as the center individually. The optical prisms 41a and 41b are controlled in such a manner that rotating directions, rotation amounts and rotating speeds are independently controlled. As a result, the optical prisms 41a and 41b deflect the distance measuring optical axis of the distance measuring light as emitted in an arbitrary direction, and deflect the light receiving optical axis of the reflected distance measuring light as received in parallel to the distance measuring optical axis.

Outer shapes of the optical prisms 41a and 41b are arranged in disk-like shape with the light receiving optical axis 37 as the center, respectively. Taking an expansion of the reflected distance measuring light into consideration, diameters of the optical prisms 41a and 41b are set so that a sufficient light amount can be obtained.

A ring gear 44a is fitted with an outer periphery of the optical prism 41a and a ring gear 44b is fitted with an outer periphery of the optical prism 41b.

A driving gear 46a meshes with the ring gear 44a, and the driving gear 46a is fixed to an output shaft of a motor 47a. A driving gear 46b meshes with the ring gear 44b, and the driving gear 46b is fixed to an output shaft of a motor 47b. The motors 47a and 47b are electrically connected to the second arithmetic processing unit 24.

As the motors 47a and 47b, motors capable of detecting a rotation angle or motors which rotate corresponding to a driving input value, for instance, a pulse motor is used. Alternatively, a rotation amount of the motor may be detected by using a rotation detector for detecting a rotation amount (rotation angle) of the motor such as an encoder (not shown), for instance, or the like. The rotation amounts of the motors 47a and 47b are detected respectively by the projecting direction detecting unit 25, and the motors 47a and 47b are individually controlled by the second arithmetic processing unit 24.

The driving gears 46a and 46b and the motors 47a and 47b are provided at positions not interfering with the distance measuring light projecting unit 21, for instance, on a lower side of the ring gears 44a and 44b.

The projecting lens 33, the distance measuring light deflecting unit 36a, or the like, make up a projection optical system. The reflected distance measuring light deflecting unit 36b and the image forming lens 39, or the like, make up a light receiving optical system.

The distance measuring unit 23 controls the light emitting element 32 and emits a laser beam as the distance measuring light. By the optical axis deflecting unit 36 (the distance measuring light deflecting unit 36a), the distance measuring optical axis O is deflected so as to direct toward a measuring point.

The reflected distance measuring light as reflected from the object to be measured enters via the optical prisms 41a and 41b (the reflected distance measuring light deflecting unit 36b) and the image forming lens 39 and is received by the photodetector 38. The photodetector 38 sends the light receiving signal to the distance measuring unit 23. The distance measuring unit 23 performs a distance measurement of the measuring point (a point where the distance measuring light is projected) based on the light receiving signal from the photodetector 38.

The second arithmetic processing unit 24 is configured by an input/output control unit, an arithmetic unit (CPU), a storage unit, or the like. The storage unit stores programs such as a distance measuring program for controlling a distance measuring operation, a control program for controlling drivings of the motors 47a and 47b, a communication program for transmitting and receiving an image and data to and from the operation device 4, and a directional angle calculating program for calculating directional angles (a horizontal angle and a vertical angle) of the distance measuring optical axis O based on calculation results in a projecting direction from the projecting direction detecting unit 25 and the detection result of the lateral rotation angle from the protractor table 5, or the like. Further, in the storage unit, measurement results such as distance measuring data, image data, or the like, are stored.

In the surveying instrument main unit 3, the attitude detecting unit 19 detects an attitude of the distance measuring unit 23 with respect to the projection optical axis 31 of the distance measuring unit 23 and the attitude of the protractor table 5 with respect to the horizontal (a tilt angle and a tilting direction). A detection result is inputted to the second arithmetic processing unit 24.

The projecting direction detecting unit 25 counts driving pulses input to the motors 47a and 47b and detects the rotation angles of the motors 47a and 47b. Alternatively, the projecting direction detecting unit 25 detects the rotation angles of the motors 47a and 47b based on signals from the encoders. Further, the projecting direction detecting unit 25 calculates rotation positions of the optical prisms 41a and 41b based on the rotation angles of the motors 47a and 47b, and calculates a deflection angle and the projecting direction of the distance measuring light based on refractive indexes and the rotation positions of the distance measuring light deflecting unit 36a (that is, the prism elements 42a and 42b). A calculation result is inputted to the second arithmetic processing unit 24.

The communication unit 26 receives a command regarding the measurement as transmitted from the operation device 4, inputs the command to the second arithmetic processing unit 24, and transmits the images as acquired to the operation device 4.

The image pickup unit 27 has a wide-angle camera 48 and a narrow-angle camera 49. The wide-angle camera 48 has a wide-field angle, for instance, 30°, while the narrow-angle camera 49 has a field angle narrower than the field angle of the wide-angle camera 48, for instance, 5°. Further, it is preferable that the field angle of the narrow-angle camera 49 is equal to or slightly larger than a data acquiring area (to be described later) by the second arithmetic processing unit 24, i.e. an area where an optical axis can be deflected by the optical axis deflecting unit 36.

Further, image pickup elements 48a and 49a of the wind-angle camera 48 and the narrow-angle camera 49 are CCDs or CMOS sensors which are aggregates of pixels, and it is so arranged that a position of each pixel on an image element can be specified. For instance, the position of each pixel is specified by a coordinate system with an optical axis of each camera as an origin point.

The optical axis of the wide-angle camera 48 and the optical axis of the narrow-angle camera 49 are both parallel to the projection optical axis 31. Further, the optical axis of the wide-angle camera 48, the optical axis of the narrow-angle camera 49, and the projection optical axis 31 are in a known relation.

Figure 8A:
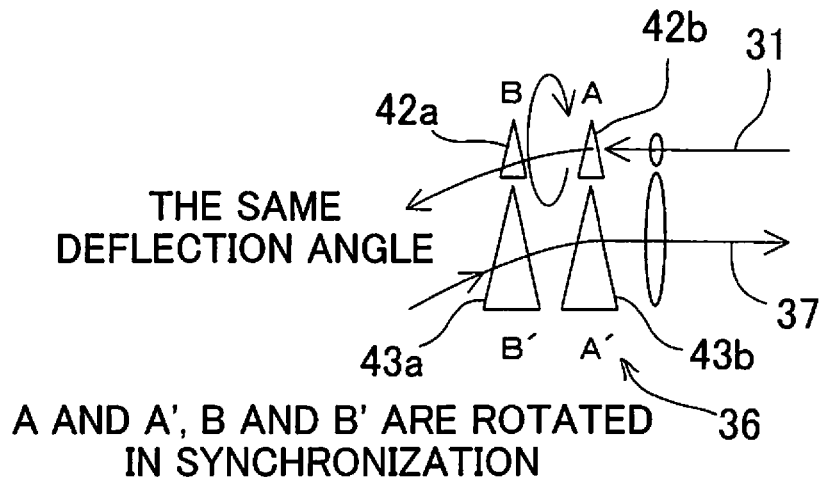
FIG. 8A, FIG. 8B and FIG. 8C are explanatory drawings to show an operation of an optical axis deflecting unit.

First, a description will be given on a measurement operation by the surveying instrument 1 by referring to FIG. 8A, FIG. 8B and FIG. 8C. To simplify the explanation, in FIG. 8A, the optical prisms 41a and 41b are shown by separating the prism elements 42a and 42b and the prism elements 43a and 43b. Further, the prism elements 42a and 42b and the prism elements 43a and 43b as shown in FIG. 8A are in a state in which maximum deflection angles can be obtained. Further, the minimum deflection angle is a position where either one of the optical prisms 41a or 41b is rotated by 180°, the deflection angle becomes 0°, and an optical axis of a laser beam as projected (the distance measuring optical axis O) becomes parallel to the projection optical axis 31.

A distance measuring light is emitted from the light emitting element 32, and the distance measuring light is turned to a parallel luminous flux by the projecting lens 33 and projected toward the object to be measured or a measurement target area through the distance measuring light deflecting unit 36a (the prism elements 42a and 42b). Here, by passing through the distance measuring light deflecting unit 36a, the distance measuring light is deflected to a direction as required and projected by the prism elements 42a and 42b.

The reflected distance measuring light as reflected by the object to be measured or by the measurement target area is incident through the reflected distance measuring light deflecting unit 36b (the prism elements 43a and 43b) and is focused on the photodetector 38 by the image forming lens 39.

Since the reflected distance measuring light passes through the reflected distance measuring light deflecting unit 36b, the optical axis of the reflected distance measuring light is deflected by the prism elements 43a and 43b so as to coincide with the light receiving optical axis 37 (FIG. 8A).

By a combination of the rotation positions of the optical prism 41a and the optical prism 41b, the deflecting direction and deflection angle of the distance measuring light to be projected can be arbitrarily changed.

Further, under a condition where a positional relation between the optical prism 41a and the optical prism 41b is fixed (under a condition where the deflection angles obtained by the optical prism 41a and the optical prism 41b are fixed), by rotating the optical prism 41a and the optical prism 41b integrally by the motors 47a and 47b, a locus drawn by the distance measuring light passing through the distance measuring light deflecting unit 36a becomes a circle with the distance measuring optical axis O as the center.

Therefore, by rotating the optical axis deflecting unit 36 while emitting the laser beam from the light emitting element 32, the distance measuring light can be scanned by the locus of the circle.

It is to be noted that it is needless to say that the reflected distance measuring light deflecting unit 36b is rotated integrally with the distance measuring light deflecting unit 36a.

Figure 8B:
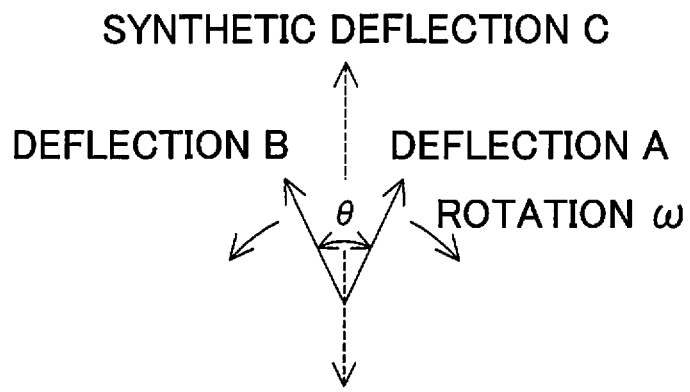

Next, FIG. 8B illustrates a case in which the optical prism 41a and the optical prism 41b are relatively rotated. Assuming that a deflecting direction of the optical axis as deflected by the optical prism 41a is a deflection "A" and the deflecting direction of the optical axis as deflected by the optical prism 41b is a deflection "B", the deflection of the optical axis by the optical prisms 41a and 41b becomes a synthetic deflection "C" as an angle difference θ between the optical prisms 41a and 41b.

Therefore, each time the angle difference θ is changed, by rotating the optical axis deflecting unit 36 once, the distance measuring light can be scanned linearly.

Figure 8C:
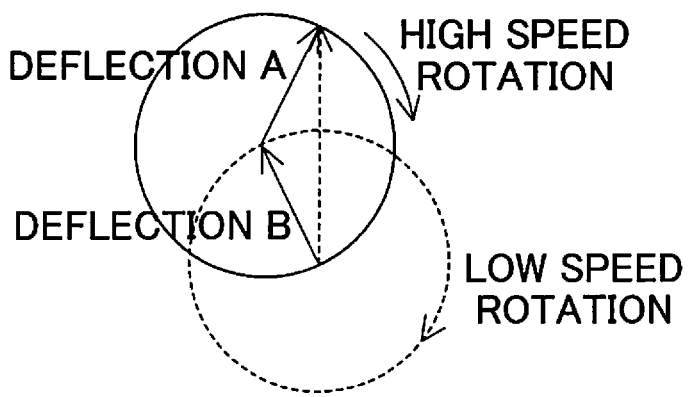

Further, as illustrated in FIG. 8C, when the optical prism 41b is rotated at a rotating speed lower than the rotating speed of the optical prism 41a, since the distance measuring light is rotated while the angle difference θ is gradually increased, the scanning locus of the distance measuring light becomes a spiral form.

Furthermore, by individually controlling the rotating direction and the rotating speed of the optical prism 41a and the optical prism 41b, the scanning locus of the distance measuring light is made in an irradiating direction (scanning in the radial direction) with the projection optical axis 31 as the center or in a horizontal direction or in a vertical direction or the like, and various scanning states can be obtained.

As a mode of measurement, by performing a distance measurement by fixing the optical axis deflecting unit 36 (the optical prisms 41a and 41b) per each deflection angle as required, the distance measurement can be performed with respect to a specific measuring point. Further, by executing the distance measurement while changing the deflection angles of the optical axis deflecting unit 36, that is, by executing the distance measurement while scanning the distance measuring light, distance measurement data with respect to a measuring point on the scanning locus can be acquired.

Further, the projection directional angle of each distance measuring light can be detected by the rotation angles of the motors 47a and 47b, and by associating the projection directional angle with the distance measurement data, three-dimensional distance measurement data can be acquired.

Further, a tilting of the projection optical axis 31 with respect to the horizontal can be detected by the attitude detecting unit 19, and based on the tilting as detected by the attitude detecting unit 19, the distance measurement data is corrected and the distance measurement data with high accuracy can be acquired. Therefore, in a case where the protractor table 5 does not have a leveling function and cannot be installed horizontally, the distance measurement data with high accuracy can be acquired.

Next, the three-dimensional distance measurement data is acquired and image data can also be acquired.

As described above, the image pickup unit 27 has the wide-angle camera 48 and the narrow-angle camera 49.

The wide-angle camera 48 is primarily used for observation, and a wide-angle image acquired by the wide-angle camera 48 is displayed on the display unit 4a.

A measuring operator searches the object to be measured or selects the object to be measured from an image displayed on the display unit 4a.

When the object to be measured is selected, the surveying instrument main unit 3 is directed toward the object to be measured so that the object to be measured is captured by the narrow-angle camera 49. A narrow-angle image acquired by the narrow-angle camera 49 is displayed on the display unit 4a. As a display method, the display of the wide-angle image by the wide-angle camera 48 and the display of the narrow-angle image by the narrow-angle camera 49 may be switched. Alternatively, the display unit 4a may be divided and display the narrow-angle image by the narrow-angle camera 49 on a divided portion or a window may be provided to display the narrow-angle image by the narrow-angle camera 49 on the window.

Since the narrow-angle image acquired by the narrow-angle camera 49 is equal to or approximately equal to a measurement area of the surveying instrument 1, the measuring operator can visually specify the measurement area easily.

Further, since the projection optical axis 31 and the optical axis of the narrow-angle camera 49 are parallel to each other, and both the optical axes are in a known relation, the second arithmetic processing unit 24 can match the image center with the projection optical axis 31 on the narrow-angle image by the narrow-angle camera 49. Further, by detecting the projection directional angle of the distance measuring light, the second arithmetic processing unit 24 can specify a measuring point on the image based on the projection directional angle. Therefore, it is possible to easily associate the three-dimensional data of the measuring point with the narrow-angle image, and the narrow-angle image as acquired by the narrow-angle camera 49 can be turned to an image with the three-dimensional data.

Figure 9A:
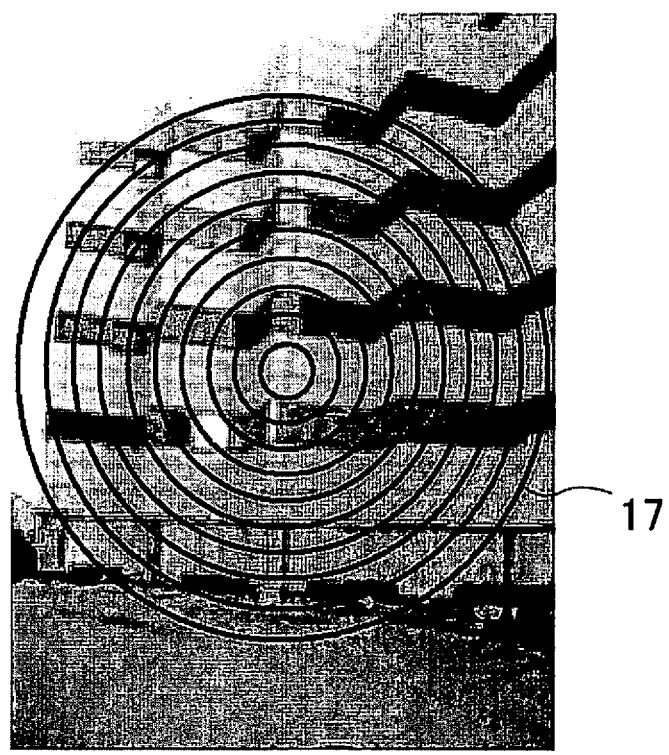
FIG. 9A and FIG. 9B are explanatory drawings to show a relation between an acquired image and a scanning locus.
Figure 9B:
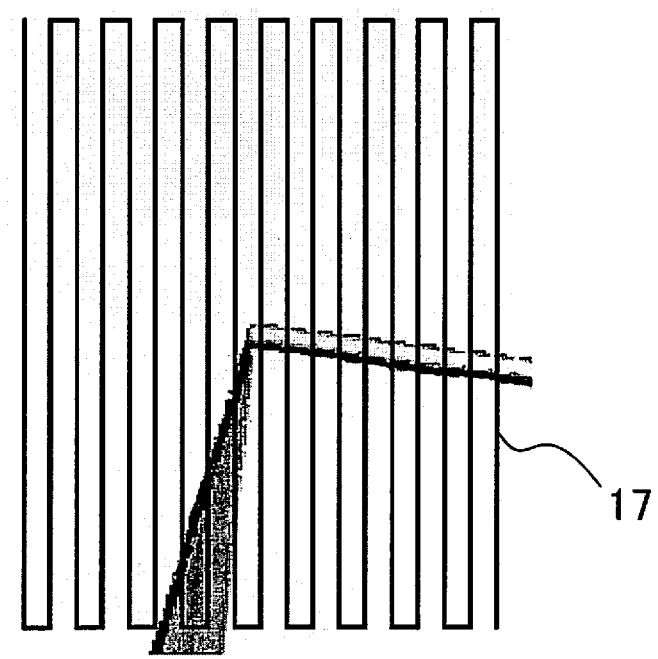

FIG. 9A and FIG. 9B show a relation between an image acquired by the narrow-angle camera 49 and a locus obtained on the measuring point. It is to be noted that FIG. 9A shows a case in which the distance measuring light is scanned in a concentric and multi-circular form and FIG. 9B shows a case in which the distance measuring light is reciprocally scanned linearly. In the figure, reference numeral 17 denotes a scanning locus and the measuring points are positioned on the scanning locus 17.

Further, in a case where the measurement of a wide area is executed, the wide-angle image acquired by the wide-angle camera 48 is made the measurement area, the narrow-angle images acquired by the narrow-angle camera 49 are fitted into the wide-angle images like a patchwork and hence the measurement can be performed without a waste or without leaving an unmeasured portion.

In the description as given above, the distance measuring light deflecting unit 36a and the reflected distance measuring light deflecting unit 36b are formed on the same optical prism and integrated together. On the other hand, the projection optical axis 31 and the light receiving optical axis 37 are separated from each other, the distance measuring light deflecting unit 36a and the reflected distance measuring light deflecting unit 36b are provided individually on the projection optical axis 31 and the light receiving optical axis 37, and it may be so arranged that the distance measuring light deflecting unit 36a and the reflected distance measuring light deflecting unit 36b are synchronously rotated.

A description will be given below on the surveying instrument 1 which has the surveying instrument main unit 3 and the attitude detecting unit 19 by referring to FIG. 10 to FIG. 12.

Figure 10:
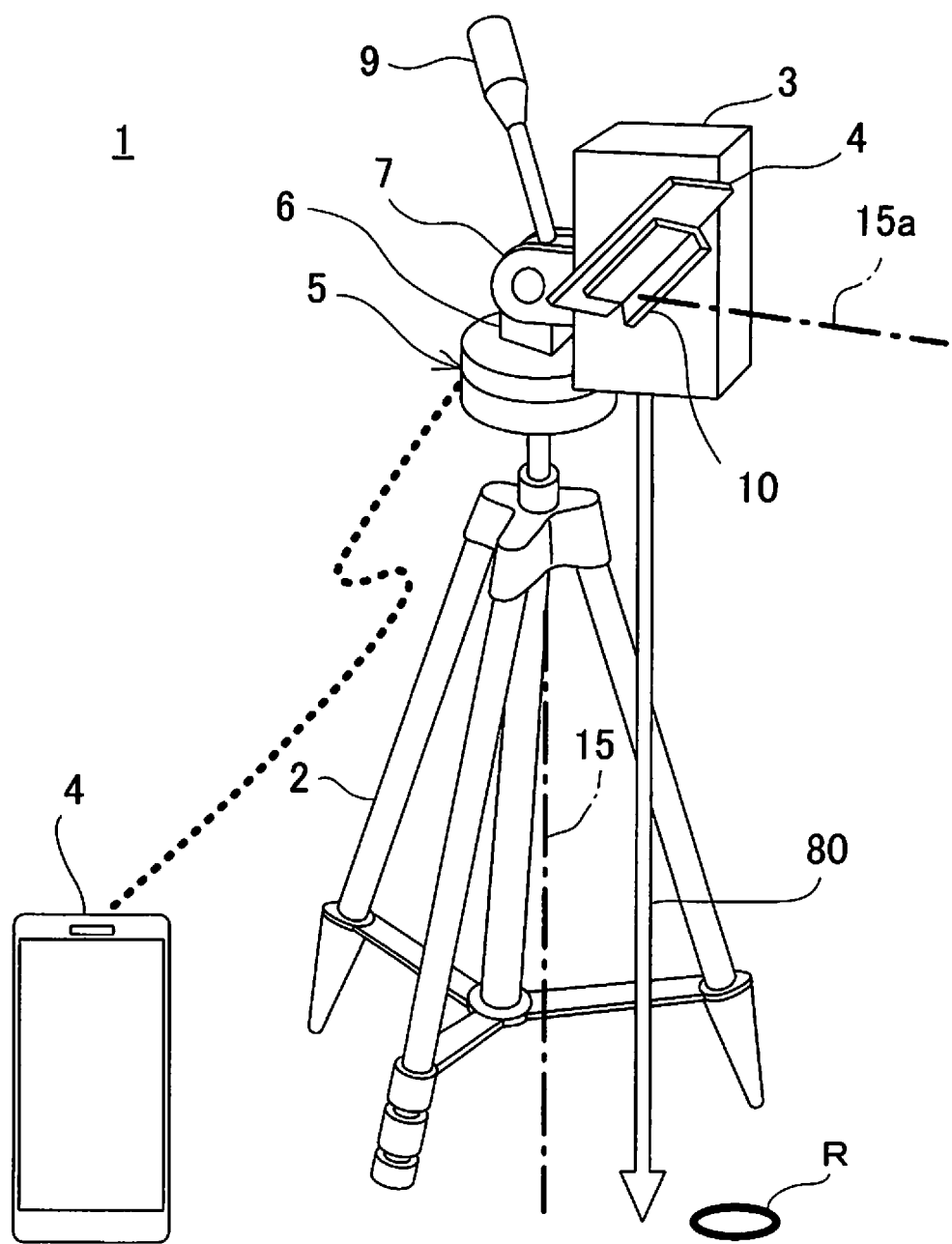
FIG. 10 is an explanatory drawing to show an installation condition of a surveying instrument in the present embodiment.

FIG. 10 shows a condition where the surveying instrument 1 is installed. It is to be noted that the operation device 4 may be detached from the surveying instrument main unit 3, and the surveying instrument main unit 3 may be remotely controlled.

The tripod 2 is installed near the reference point R. The tripod 2 is installed at a point deviated from the reference point R.

The surveying instrument main unit 3 is rotated by an angle of 90° (see FIG. 10).

In this condition, the attitude detecting unit 19 detects the horizontal and detects the tilt angle and the tilting direction of the surveying instrument main unit 3 with respect to the horizontal (or the vertical). These tilt angle and the tilting direction are obtained based on the detection result of the first encoder 62 and the second encoder 66 (see FIG. 5). The tilt angle and the tilting direction as detected are equal to the tilt angle and the tilting direction of the protractor table 5 with respect to the vertical.

From the surveying instrument main unit 3, a distance measuring light 80 is projected downward. Normally, an irradiating point (the measuring point) of the distance measuring light 80 is deviated from the reference point R.

From the operation device 4, a command is issued so as to drive the optical axis deflecting unit 36, and an irradiating direction of the distance measuring light 80 is adjusted. The condition of this adjustment can be confirmed by displaying the image acquired by the image pickup unit 27 on the display unit 4a.

The irradiating point of the distance measuring light 80 is made to coincide with the reference point R, the distance measurement to the reference point R at that time is performed, and the deflection angle with respect to the light receiving optical axis 37 is obtained. The deflection angle can be measured by the rotation amount of the motors 47a and 47b.

Figure 11:
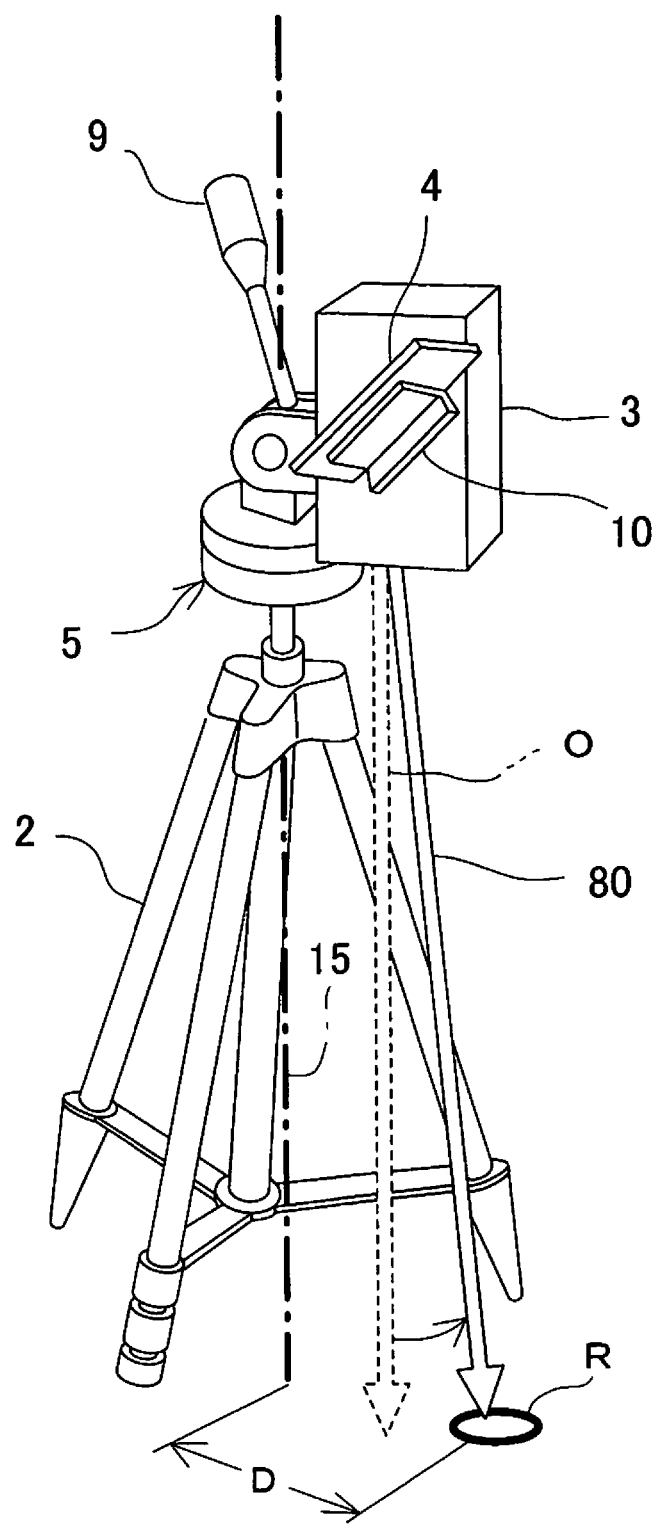
FIG. 11 is an explanatory drawing to show a measurement of a reference point of an installation of the surveying instrument in the present embodiment.

By a result of the distance measurement to the reference point R and by the measurement of the deflection angle, it is possible to calculate as to in which direction and how much the mechanical reference line 15 is deviated from the reference point R (a deviation amount D) (see FIG. 11).

The tilt angle of the protractor table 5 with respect to the horizontal is detected, and by obtaining as to in which direction and how much the mechanical reference line 15 is deviated from the reference point R (the deviation amount D), it is possible to correct the measurement value.

Therefore, the surveying instrument 1 can be installed near the reference point R and the measurement can be performed immediately without performing leveling.

Figure 12:
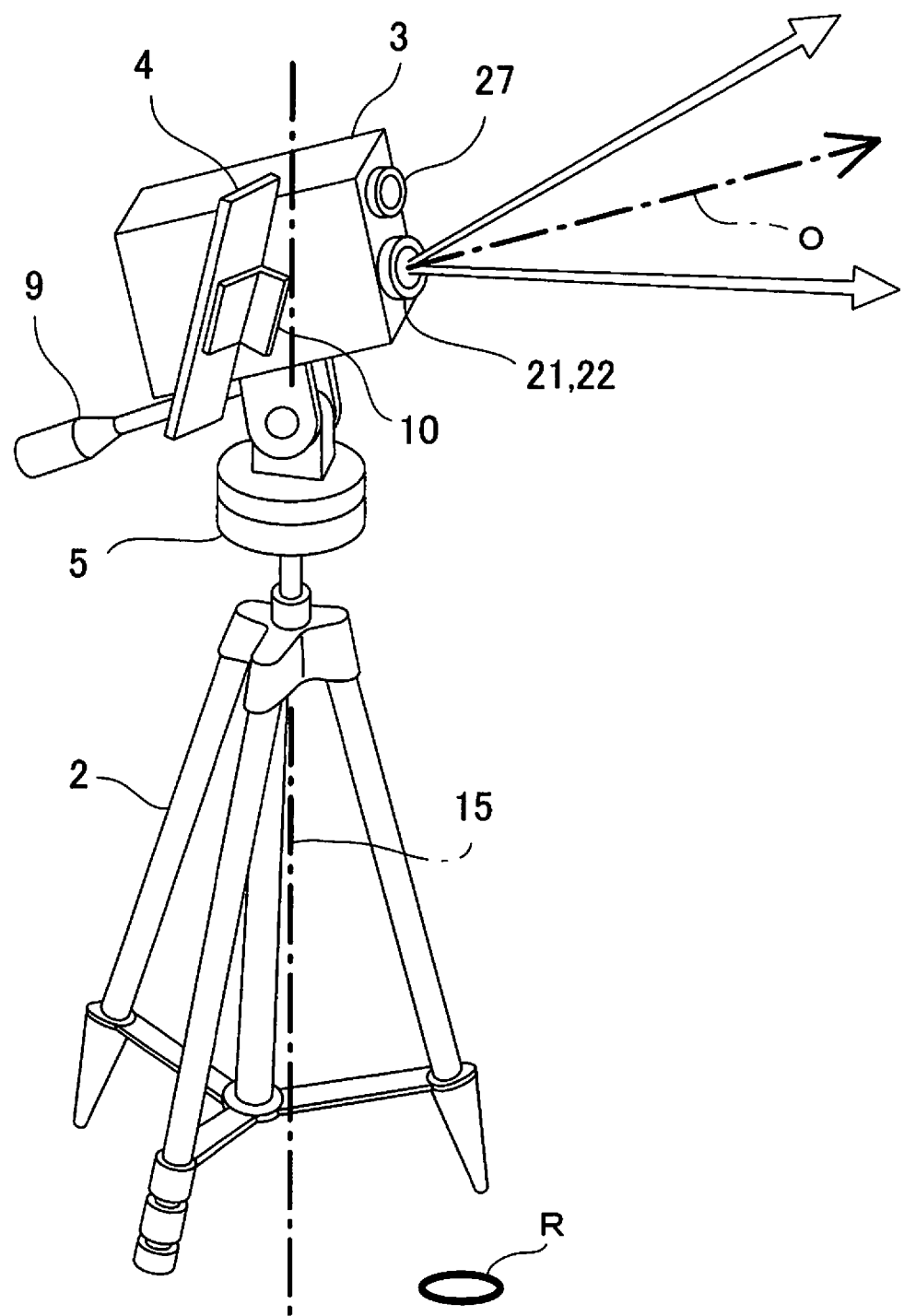
FIG. 12 shows an explanatory drawing to show a normal measurement condition of the surveying instrument in the present embodiment.

FIG. 12 shows a normal measurement condition and it is a condition where the distance measuring optical axis O is directed toward the object to be measured. When the measurement is performed, in a case where the measuring point is within the area of the image of the narrow-angle camera 49, the measuring point is determined according to the deflection of the optical axis by the optical axis deflecting unit 36.

In the measurement within the area of the narrow-angle camera 49, the measurement can be performed while confirming the measuring point on the image, and this contributes to a promotion of higher working efficiency.

Further, in a case where the measurement in wider area is executed beyond the area of the image of the narrow-angle camera 49, the wide-angle image acquired by the wide-angle camera 48 is regarded as the measurement area, the narrow-angle images acquired by the narrow-angle camera 49 are filled into the wide-angle images like the patchwork and hence the measurement can be carried out without the waste or without the unmeasured portion.

Further, in a case where the measurement is carried out, if the measuring point can be captured within the area of the image of the narrow-angle camera 49, the distance measuring optical axis O can be accurately sighted by the optical axis deflecting unit 36. Further, a sighting condition can be confirmed on the image. Therefore, a sighting operation by the operator does not need, and a measurement operation can be performed easily and promptly.

Further, a driving mechanism for rotating the surveying instrument main unit 3 laterally and longitudinally with high accuracy becomes unnecessary, and this contributes to a reduce of a cost of an instrument.

Figure 13:
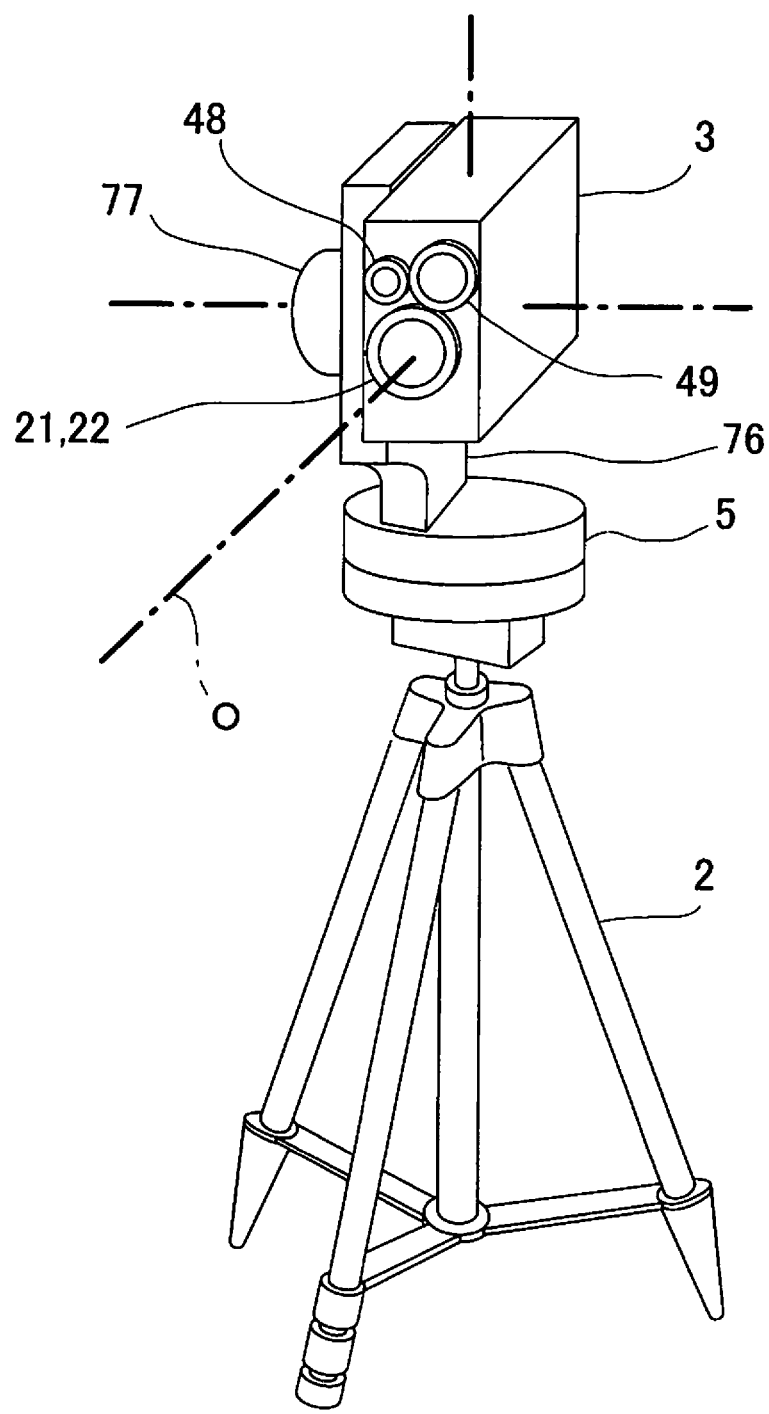
FIG. 13 is a drawing to show another embodiment.

FIG. 13 shows another embodiment in which another supporting mechanism for rotatably supporting a surveying instrument main unit 3 longitudinally.

It is to be noted that in FIG. 13, what are equivalent to components as shown in FIG. 1 are referred by the same symbol.

On a protractor table 5, a longitudinal rotation supporting base 76 is erected, and a surveying instrument main unit 3 is rotatably supported via a lateral shaft (not shown) around the lateral shaft as a center on the longitudinal rotation supporting base plate 76.

A rotary knob 77 is provided on the longitudinal rotation supporting base 76, and it is so arranged that the surveying instrument main unit 3 rotates by rotating the rotary knob 77. Further, an angle detector may be provided inside the rotary knob 77.

Further, a rotation center of the surveying instrument main unit 3 is deviated from the center of the protractor table 5 so that the distance measuring light optical axis O does not interfere with the protractor table 5 when the surveying instrument main unit 3 is rotated by an angle of 90° and the distance measuring optical axis O is directed downward.

In another embodiment also, the angle detector is provided so that a position of the surveying instrument main unit 3 as rotated by an angle of 90° with respect to the protractor table 5 can be detected, or a mechanism which can determine the position of 90° mechanically is provided.

The invention claimed is:

1. A surveying instrument comprising;
an installation base installed at a point which is near a reference point and. is deviated. from. the reference point and a protractor table which is perpendicular to a mechanical reference line as set for the surveying instrument and is capable of detecting a lateral rotation angle and
a surveying instrument main unit mounted on said protractor table via supporting mechanisms capable of rotating longitudinally,
wherein said supporting mechanisms has a lower supporting piece provided on said protractor table, an upper supporting piece provided on said surveying instrument main unit, and a longitudinal rotation. shaft which. freely rotatably connects said lower supporting piece with. said upper supporting piece, and said supporting mechanisms enables said surveying instrument main unit to set in a predetermined angle condition with. respect to said protractor table,
wherein said surveying instrument main unit comprises a distance measuring unit which has a light emitting element for emitting a distance measuring light, a distance measuring light projecting unit for projecting said distance measuring light, a light receiving unit for receiving a reflected distance measuring light and a photodetector for receiving said reflected distance measuring light and for producing light receiving signal, and said distance measuring unit performs a distance measurement of an object to be measured based on said light receiving signal from said photodetector,
a control unit for controlling a distance measuring operation, an optical axis deflecting unit, which is provided on an optical axis of said distance measuring light projecting unit and on an optical axis of said light receiving unit, for controlling a deflection of said both optical axes and
an attitude detecting unit which has a tilt detecting unit for detecting horizontal and mechanisms for tilting said tilt detecting unit so that said. tilt detecting unit is maintained horizontally, and is configured to detect a tilting amount of said surveying instrument main unit,
and wherein said supporting mechanisms have a radius of gyration with said longitudinal rotation. shaft as a center and are capable of rotating said surveying instrument main unit longitudinally downward by 90°, and said supporting mechanisms are configured to contact said upper supporting piece with said protractor table when said surveying instrument main unit is rotated downward by 90°, and in a condition where said surveying instrument main unit is rotated downward by 90°, said optical axis of said distance measuring light projecting unit and said mechanical reference line are deviated by a predetermined distance, and said distance measuring light, which is projected from said surveying instrument main unit, is configured to pass an outside of said protractor table and to strike the ground.

2. The surveying instrument according to claim 1, wherein said control unit is configured to calculate the tilting amount of said surveying instrument main unit with respect to a vertical based on the tilting amount detected. by said. attitude detecting unit in a condition where said surveying instrument main unit is in the predetermined angle condition with respect to said protractor table, to calculate a tilting amount of said protractor table with respect to the horizontal, and to correct a measurement result of said object to be measured based on a calculation result.

3. The surveying instrument according to claim 1, wherein said control unit is configured to calculate the tilting amount of said surveying instrument main unit with respect to the vertical based on the tilting amount detected by said attitude detecting unit in a condition where said surveying instrument main unit is in the predetermined angle condition with respect to said protractor table, and to deflect said optical axis of said distance measuring light projecting unit so that said distance measuring light is projected vertically by said optical axis deflecting unit.

4. The surveying instrument according to claim 1, wherein said installation base is installed near a reference point, and said control unit is configured to calculate the tilting amount of said surveying instrument main unit with respect to the vertical based on the tilting amount detected by said attitude detecting unit in a condition where said surveying instrument main unit is in the predetermined angle condition with respect to said protractor table, to project said distance measuring light to said reference point by controlling said optical axis deflecting unit, and to measure a position of said reference point based on said tilting amount, on a deflection amount of said distance measuring light by said optical axis deflecting unit and on a result of the distance measurement to said reference point.

5. The surveying instrument according to claim 3, wherein said installation base is installed near the reference point, and said control unit is configured to calculate the tilting amount of said surveying instrument main unit with respect to the vertical based on the tilting amount detected by said attitude detecting unit in a condition where said surveying instrument main unit is in the predetermined angle condition with respect to said protractor table, to project said distance measuring light to said reference point by controlling said optical axis deflecting unit, and to measure the position of said reference point based on said tilting amount, on the deflection amount of said distance measuring light by said optical axis deflecting unit and on the result of the distance measurement to said reference point.

6. The surveying instrument according to claim 1, wherein said control unit is configured to change an irradiating direction of said distance measuring light by said optical axis deflecting unit, to project said distance measuring light to a measuring point, and to perform a measurement of said measuring point.

7. The surveying instrument according to claim 3, wherein said control unit is configured to chancre the irradiating direction of said distance measuring light by said optical axis deflecting unit, to project said distance measuring light to said measuring point, and to perform the measurement of said measuring point.

8. The surveying instrument according to claim 4, wherein said control unit is configured to change the irradiating direction of said distance measuring light by said optical axis deflecting unit, to project said distance measuring light to said measuring point, and to perform the measurement of said measuring point.

9. The surveying instrument according to claim. 5, wherein said control unit is configured to chancre the irradiating direction of said distance measuring light by said optical axis deflecting unit, to project said distance measuring light to said measuring point, and to perform the measurement of said measuring point.

10. The surveying instrument according to claim 2, wherein said control unit is configured to calculate the tilting amount of said surveying instrument main unit with respect to the vertical based. on the tilting amount detected by said attitude detecting unit in a condition where said surveying instrument main unit is in the predetermined angle condition with respect to said protractor table, and to deflect said optical axis of said distance measuring light projecting unit so that said distance measuring light is projected vertically by said optical axis deflecting unit.

11. The surveying instrument according to claim 2, wherein said installation base is installed near a reference point, and said control unit is configured to calculate the tilting amount of said surveying instrument main unit with respect to the vertical based on the tilting amount detected by said attitude detecting unit in a condition where said surveying instrument main unit is in the predetermined angle condition with respect to said protractor table, to project said distance measuring light to said reference point by controlling said optical axis deflecting unit, and to measure a position of said reference point based on said tilting amount, on a deflection amount of said. distance measuring light by said optical axis deflecting unit and on a result of the distance measurement to said reference point.

12. The surveying instrument according to claim 10, where said installation base is installed near the reference point, and said control unit is configured to calculate the tilting amount of said surveying instrument main unit with respect to the vertical based on the tilting amount detected by said attitude detecting unit in a condition where said surveying instrument main unit is in the predetermined angle condition with respect to said protractor table, to project said distance measuring light to said reference point by controlling said optical axis deflecting unit, and to measure the position of said reference point based on said tilting amount, on the deflection amount of said distance measuring light by said optical axis deflecting unit and on the result of the distance measurement to said reference point.

13. The surveying instrument according to claim 2, wherein said control unit is configured to change an irradiating direction of said distance measuring light by said optical axis deflecting unit, to project said distance measuring light to a measuring point, and to perform a measurement of said measuring point.

14. The surveying instrument according to claim 10, wherein said control unit is configured to change the irradiating direction of said distance measuring light by said optical axis deflecting unit, to project said distance measuring light to said measuring point, and to perform the measurement of said measuring point.

15. The surveying instrument according to claim 11, wherein said control unit is configured to change the irradiating direction of said distance measuring light by said optical axis deflecting unit, to project said distance measuring light to said measuring point, and to perform the measurement of said measuring point.

16. The surveying instrument according to claim 12, wherein said control unit is configured to change the irradiating direction of said distance measuring light by said optical axis deflecting unit, to project said distance measuring light to said measuring point, and to perform the measurement of said measuring point.

* * * * *